Patented Nov. 4, 1924.

1,514,348

UNITED STATES PATENT OFFICE.

MAX Y. SEATON, OF MIDLAND, MICHIGAN, ASSIGNOR TO THE DOW CHEMICAL COMPANY, OF MIDLAND, MICHIGAN, A CORPORATION OF MICHIGAN.

INSECTICIDE.

No Drawing.   Application filed January 27, 1919.   Serial No. 273,237.

*To all whom it may concern:*

Be it known that I, MAX Y. SEATON, a citizen of the United States, and a resident of Midland, county of Midland, and State of Michigan, have invented a new and useful Improvement in Insecticides, of which the following is a specification; the principle of the invention being herein explained, and the best mode in which I have contemplated applying that principle so as to distinguish it from other inventions.

The present improvements relating as indicated to insecticidal compositions have more particular regard to the so-called arsenicals, specifically the arsenates, of which lead arsenate is not only typical but practically the only one that has heretofore been practically used on an extensive scale. It is well known that both the ortho-arsenate $Pb_3(AsO_4)_2$, and the acid arsenate ($PbHAsO_4$), as well as the intermediate substance which may be regarded either as a true chemical compound or as a mixture of the foregoing ortho- and acid arsenates constitute a very efficacious insecticide for combatting many forms of insect pests. Calcium arsenate and magnesium arsenate have more recently been prepared for insecticidal use and the latter in particular is expected to prove a very satisfactory arsenical. In the case of these arsenates it has been found desirable to prepare them in dry or powdered form in order to save in shipping cost since the water carried in the paste is that much dead weight, and also to serve the convenience of the user since the dry product may obviously be more conveniently handled and measured, while owing to the tendency of the paste to dry out or cake if allowed to stand over from one season to another there is an element of loss involved in using this form.

It has been found a matter of some difficulty to prepare a powdered arsenate, particularly lead arsenate, that will retain the desirable slow settling quality of the freshly precipitated or paste product, although it is a matter of general recognition that the dilution of the solutions in which the reactions are carried on, in originally precipitating the arsenate is a factor of importance in this connection as well as the means used for fining or reducing to a powder the precipitate after it is separated from the residual solution and dried.

The present invention is based partly on the discovery of certain factors that are influential in determining the character of the dry powdered product and that the addition of a certain class or substances to such product materially improves the same in that a non-settling colloidal state is obtained when the product is mixed with water. As a result not only is the product extremely slow-settling in character but it also presents superior spreading and adhesive qualities when applied to plants and foliage.

To the accomplishment of the foregoing and related objects the invention then consists of the novel composition of matter hereinafter described, it being understood, however, as to the ingredients employed in such composition that changes may be made therein without departing from the spirit of the invention.

Referring first of all to the manufacture of lead arsenate, it has already been indicated that this may consist either of the ortho-arsenate $Pb_3(AsO_4)_2$, or the acid arsenate $PbHAsO_4$, or of the intermediate substance which is regarded by some as being merely a mixture of the foregoing. Preferably I form such arsenate by reacting between dilute solutions of lead acetate and arsenic acid, the reaction that occurs being expressed by the following equations, viz:

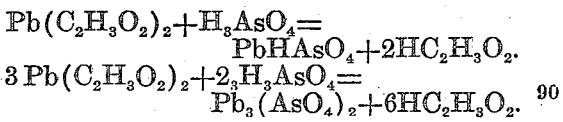

Under the conditions stated the arsenate is precipitated out in the amorphous form i. e. consists of particles of submicroscopic size which, however, evidence a tendency to agglomerate, i. e. collect in flocks. In order to secure a slow settling powder from such precipitate it is necessary after drying the same, familiar means being used for such drying, to disintegrate the resulting product by the use of a pulverizing machine or disintegrator of the type in which stationary and revolving diaphragms are employed rather than an ordinary mill, the tendency of the latter being to compact the particles with the result that the dry product thus prepared settles more rapidly than the original product from which it is made.

Even where the dry product is pulverized in such fashion as to avoid compacting the particles, upon mixing the same again with water the same tendency of the particles to group into aggregates of larger size becomes evident and it is at this stage that the more striking improvement has been made. I have found that such grouping or coagulation can be prevented and the colloidal condition of the material maintained in such mixture by the addition of a substance which itself forms a colloidal solution in water of the emulsoid type. As typical of such substance I have found soluble casein e. g. the sodium salt of casein, entirely satisfactory; also gelatine, both of these being protective colloids of high efficiency, so that only a very small quantity of such substance is required, 4% by weight (dry) of such soluble casein serving the purpose admirably. When regarded under the microscope a properly dilute mixture of the arsenate in water with such substance added exhibits a strikingly different appearance from a mixture of the same product without such additional substance; in other words the particles apparently tend to separate and remain in separated condition instead of to agglomerate or collect in flocks.

The result is a mixture that is of extremely slow settling quality; in fact, so far as its practical use is concerned no settling of consequence whatever occurs. Furthermore, when applied to foliage not only does the mixture spread more uniformly and evenly over the same but the particles of arsenate are maintained in uniformly distributed condition while at the same time the casein or equivalent substance increases the adherence of the mixture not only in the wet but equally in the dry state i. e. after the water has evaporated.

Where the arsenate as originally precipitated is of a crystalline character rather than of the amorphous form referred to as preferable there is still some advantage obtainable by the addition of a deflocculating agent such as the casein or gelatine hereinbefore referred to although the benefits are not as pronounced as in the type of precipitate specifically described. I have also found that the addition of such substances to other substantially insoluble arsenates, particularly to magnesium arsenate, has the same effect in a degree as upon lead arsenate in that the tendency of the particles to coagulate or form flocks is overcome and at the same time the mixture will spread more evenly and adhere better to the foliage.

The casein or equivalent deflocculating ingredient is preferably added in dry form to the dried arsenate either previously to the pulverizing of the latter or subsequently thereto. In the latter case the added substance must itself of course be finely ground or pulverized before it is thus added.

Other modes of applying the principle of my invention may be employed instead of the one explained, change being made as regards the composition and method herein disclosed, provided the ingredients stated by any of the following claims or the equivalent of such stated ingredients be employed.

I therefore particularly point out and distinctly claim as my invention:—

1. A composition of matter for insecticidal use comprising a substantially insoluble arsenical and a small percentage of a soluble casein compound admixed therewith.

2. A composition of matter for insecticidal use comprising a substantially insoluble arsenical and a relatively small quantity of an alkali metal salt of casein admixed therewith.

3. A composition of matter for insecticidal use comprising a substantially insoluble arsenical, and approximately four per cent of the sodium salt of casein admixed therewith.

4. A composition of matter for insecticidal use comprising an insoluble metallic arsenate and a relatively small quantity of a soluble casein compound.

5. A composition of matter for insecticidal use comprising an insoluble dry, finely pulverized metallic arsenate and a small percentage of a soluble casein compound admixed therewith.

6. A composition of matter for insecticidal use comprising lead arsenate and approximately four per cent of the sodium salt of casein admixed therewith, both of said ingredients being dry and finely pulverized.

Signed by me, this 23rd day of January, 1919.

MAX Y. SEATON.